(12) United States Patent
Mani et al.

(10) Patent No.: US 10,586,000 B1
(45) Date of Patent: Mar. 10, 2020

(54) CURRENT MODELING PROCESS

(71) Applicant: Cadence Design Systems, Inc., San Jose, CA (US)

(72) Inventors: Anshu Mani, Noida (IN); Bhuvnesh Kumar, Haryana (IN); Xin Gu, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 14 days.

(21) Appl. No.: 16/130,027

(22) Filed: Sep. 13, 2018

(51) Int. Cl.
*G06F 17/50* (2006.01)

(52) U.S. Cl.
CPC ...... *G06F 17/5036* (2013.01); *G06F 17/5045* (2013.01)

(58) Field of Classification Search
USPC .......................................................... 716/111
See application file for complete search history.

(56) References Cited

U.S. PATENT DOCUMENTS

2014/0181771 A1\* 6/2014 Sajid ................... G06F 17/5081 716/113

\* cited by examiner

*Primary Examiner* — Eric D Lee
(74) *Attorney, Agent, or Firm* — Mark H. Whittenberger, Esq.; Holland & Knight LLP

(57) ABSTRACT

The present disclosure relates to modeling the transient current of a partially simulated hierarchical gate-level electronic design. Embodiments may include providing a partially simulated hierarchical gate-level electronic design, wherein the design includes a design hierarchy having one or more leaf blocks associated therewith. Embodiments may also include identifying activity of sequential elements of the leaf blocks using simulation vectors, wherein the activity is used to estimate an amount of current associated with the sequential elements. Embodiments may further include computing an adaptive activity of a parent block of the leaf blocks, wherein the adaptive activity of the parent block corresponds to a weighted average of known activity of leaf blocks. Embodiments may also include generating an adaptive activity of a top block of the leaf blocks based upon the adaptive activity of the parent block and performing a mixed-mode simulation based upon the adaptive activity of the top block.

20 Claims, 10 Drawing Sheets

200

202 providing, using one or more processors, a partially simulated hierarchical gate-level electronic design, wherein the design includes a design hierarchy having one or more leaf blocks associated therewith

204 identifying activity of one or more sequential elements of the one or more leaf blocks using one or more simulation vectors, wherein the activity is used to estimate an amount of current associated with the one or more sequential elements

206 computing an adaptive activity of a parent block of the one or more leaf blocks, wherein the adaptive activity of the parent block corresponds to a weighted average of known activity of one or more leaf blocks

208 generating an adaptive activity of a top block of the one or more leaf blocks, based upon, at least in part, the adaptive activity of the parent block

210 performing a mixed-mode simulation based upon, at least in part, the adaptive activity of the top block

FIG. 2

CURRENT MODELING PROCESS

FIELD OF THE INVENTION

The present disclosure relates to electronic design, and more specifically, to a method for modeling transient current of a partially simulated hierarchical gate level design.

DISCUSSION OF THE RELATED ART

EDA utilizes software tools that may be used in the design and analysis of numerous electronic systems such as printed circuit boards (PCBs) and integrated circuits (ICs). Some EDA tools include mapping of register-transfer-level vector names to gate-level netlist names. In the presence of simulation vectors, a power analysis tool can find the transient state of cells in the design and model current for any state change, using vector-based analysis flow. In the absence of vectors, transient power analysis is performed based on the vectorless modeling of the circuit. In this model, sequential elements are activated to achieve a target design activity specified by user. The state of sequential elements is further propagated through the combination circuit and current for each transient state change is modelled.

For a multi-million instance full chip design, it is difficult to obtain full simulation data. At the same time, if the design is hierarchical and vectors are available for a few blocks, it is desirable to use available activity data for those blocks and use the vector-less technique to simulate the rest of the design, leading to a mixed-mode simulation scenario.

In mixed-mode simulation, the tool expects the user to predict a target activity of the circuit. This target activity is used to anchor the vector-less simulation for the un-annotated portion of the design. In reality, it is difficult for the user to predict a target activity of the circuit. Any approximation leads to a very unrealistic analysis, making mixed mode simulation unreliable.

SUMMARY

In one or more embodiments of the present disclosure, a computer-implemented method for modeling transient current of a partially simulated hierarchical gate-level electronic design is provided. The method may include providing, using one or more processors, a partially simulated hierarchical gate-level electronic design, wherein the design includes a design hierarchy having one or more leaf blocks associated therewith. The method may also include identifying activity of one or more sequential elements of the one or more leaf blocks using one or more simulation vectors, wherein the activity is used to estimate an amount of current associated with the one or more sequential elements. The method may further include computing an adaptive activity of a parent block of the one or more leaf blocks, wherein the adaptive activity of the parent block corresponds to a weighted average of known activity of one or more leaf blocks. The method may also include generating an adaptive activity of a top block of the one or more leaf blocks, based upon, at least in part, the adaptive activity of the parent block and performing a mixed-mode simulation based upon, at least in part, the adaptive activity of the top block.

One or more of the following features may be included. In some embodiments, generating an adaptive activity of a top block of the one or more leaf blocks may include hierarchically computing activity from a bottom-most level up through the design hierarchy until determining the adaptive activity of the top block. The adaptive activity of the top block or the adaptive activity of the parent block may be based upon, at least in part, a sum of a number of block instances and a block activity level. The adaptive activity of the top block or the adaptive activity of the parent block may be based upon, at least in part, a list of blocks having known activity levels. The one or more leaf blocks may include at least one block having a known activity level, at least one block having an unknown activity level, and at least one block having a calculated activity level. Performing a mixed-mode simulation may include a vector based analysis method and a vector-less analysis method. Generating the adaptive activity of the top block of the one or more leaf blocks may be based upon, at least in part, the adaptive activity of a plurality of parent blocks.

In one or more embodiments of the present disclosure, a system for modeling transient current of a partially simulated hierarchical gate-level electronic design is provided. The system may include a computing device having at least one processor configured to receive, using one or more processors, a partially simulated hierarchical gate-level electronic design, wherein the design includes a design hierarchy having one or more leaf blocks associated therewith. The at least one processor may be further configured to identify activity of one or more sequential elements of the one or more leaf blocks using one or more simulation vectors, wherein the activity is used to estimate an amount of current associated with the one or more sequential elements. The at least one processor may be further configured to compute an adaptive activity of a parent block of the one or more leaf blocks, wherein the adaptive activity of the parent block corresponds to a weighted average of known activity of one or more leaf blocks. The at least one processor may be further configured to generate an adaptive activity of a top block of the one or more leaf blocks, based upon, at least in part, the adaptive activity of the parent block. The at least one processor may be further configured to perform a mixed-mode simulation based upon, at least in part, the adaptive activity of the top block.

One or more of the following features may be included. In some embodiments, generating an adaptive activity of a top block of the one or more leaf blocks may include hierarchically computing activity from a bottom-most level up through the design hierarchy until determining the adaptive activity of the top block. The adaptive activity of the top block or the adaptive activity of the parent block may be based upon, at least in part, a sum of a number of block instances and a block activity level. The adaptive activity of the top block or the adaptive activity of the parent block may be based upon, at least in part, a list of blocks having known activity levels. The one or more leaf blocks may include at least one block having a known activity level, at least one block having an unknown activity level, and at least one block having a calculated activity level. Performing a mixed-mode simulation may include a vector based analysis method and a vector-less analysis method. Generating the adaptive activity of the top block of the one or more leaf blocks may be based upon, at least in part, the adaptive activity of a plurality of parent blocks.

In one or more embodiments of the present disclosure, a computer readable storage medium having stored thereon instructions, which when executed by a processor, result in one or more operations is provided. Operations may include providing, using one or more processors, a partially simulated hierarchical gate-level electronic design, wherein the design includes a design hierarchy having one or more leaf blocks associated therewith. Operations may also include identifying activity of one or more sequential elements of the one or more leaf blocks using one or more simulation vectors, wherein the activity is used to estimate an amount of current associated with the one or more sequential elements. Operations may further include computing an adaptive activity of a parent block of the one or more leaf blocks, wherein the adaptive activity of the parent block corresponds to a weighted average of known activity of one or more leaf blocks. Operations may also include generating an adaptive activity of a top block of the one or more leaf blocks, based upon, at least in part, the adaptive activity of the parent block and performing a mixed-mode simulation based upon, at least in part, the adaptive activity of the top block.

One or more of the following features may be included. In some embodiments, generating an adaptive activity of a top block of the one or more leaf blocks may include hierarchically computing activity from a bottom-most level up through the design hierarchy until determining the adaptive activity of the top block. The adaptive activity of the top block or the adaptive activity of the parent block may be based upon, at least in part, a sum of a number of block instances and a block activity level. The adaptive activity of the top block or the adaptive activity of the parent block may be based upon, at least in part, a list of blocks having known activity levels. The one or more leaf blocks may include at least one block having a known activity level, at least one block having an unknown activity level, and at least one block having a calculated activity level. Performing a mixed-mode simulation may include a vector based analysis method and a vector-less analysis method. Generating the adaptive activity of the top block of the one or more leaf blocks may be based upon, at least in part, the adaptive activity of a plurality of parent blocks.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flowchart depicting operations consistent with the current modeling process of the present disclosure;

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
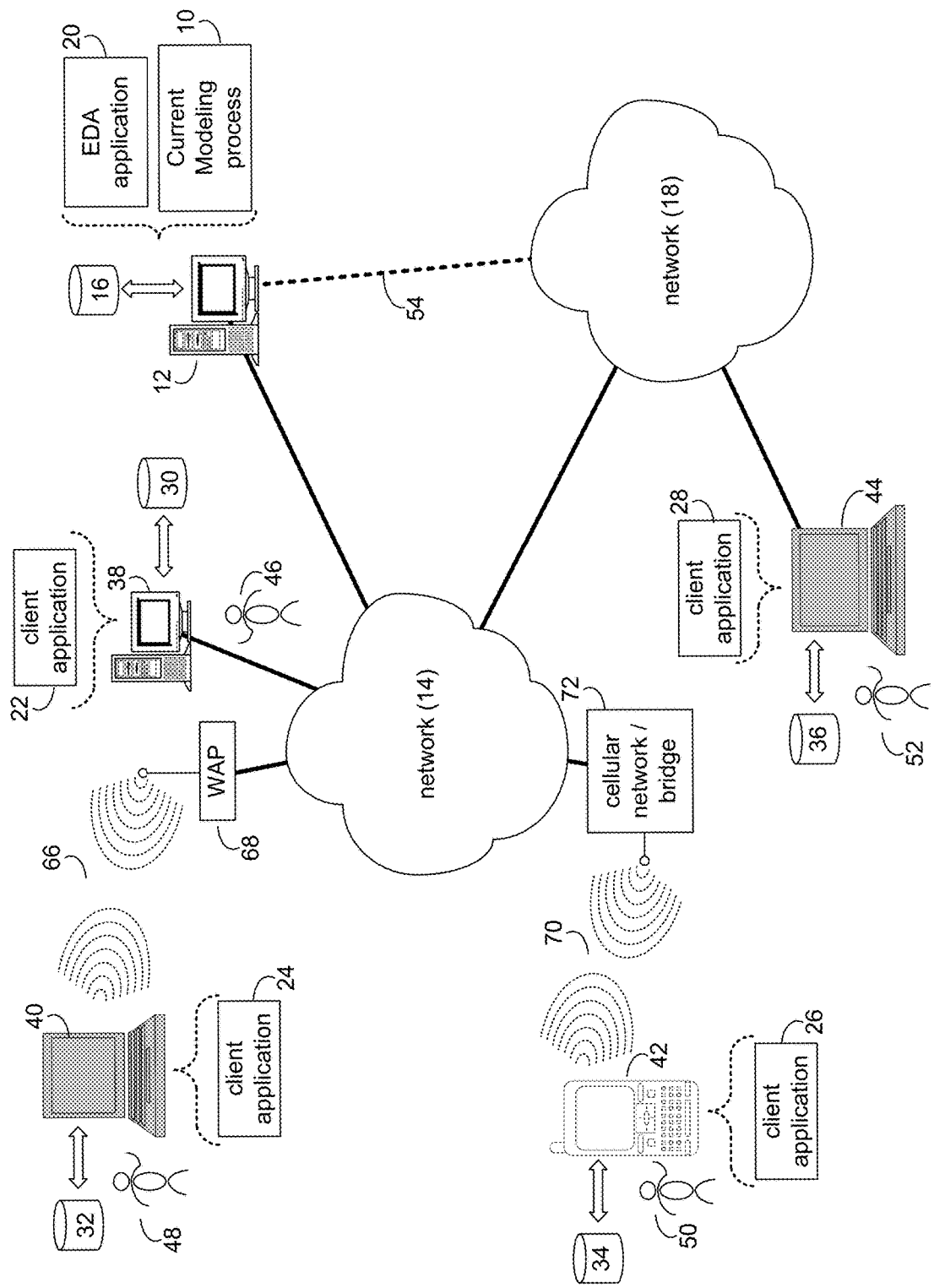
FIG. 1 is a system diagram depicting aspects of the current modeling process in accordance with an embodiment of the present disclosure.

Referring to FIG. 1, there is shown current modeling process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the current modeling process may reside on and be executed, in whole or in part, by a client electronic device, such as a personal computer, notebook computer, personal digital assistant, or the like.

The instruction sets and subroutines of current modeling process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Current modeling process 10 may be a stand-alone application, or may be an applet/application/script that may interact with and/or be executed within EDA application 20. In addition/as an alternative to being a server-side process, the current modeling process may be a client-side process (not shown) that may reside on a client electronic device (described below) and may interact with an EDA client application (e.g., one or more of EDA client applications 22, 24, 26, 28). Further, the current modeling process may be a hybrid server-side/client-side process that may interact with EDA application 20 and an EDA client application (e.g., one or more of client applications 22, 24, 26, 28). As such, the current modeling process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize current modeling process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Embodiments of current modeling process 10 shown in FIGS. 1-10 may provide for modeling transient current of a partially simulated hierarchical gate-level electronic design. The process may include providing (202), using one or more processors, a partially simulated hierarchical gate-level electronic design, wherein the design includes a design hierarchy having one or more leaf blocks associated therewith. The process may also include identifying (204) activity of one or more sequential elements of the one or more leaf blocks using one or more simulation vectors, wherein the activity is used to estimate an amount of current associated with the one or more sequential elements. The process may also include computing (206) an adaptive activity of a parent block of the one or more leaf blocks, wherein the adaptive activity of the parent block corresponds to a weighted average of known activity of one or more leaf blocks. The process may further include generating (208) an adaptive activity of a top block of the one or more leaf blocks, based upon, at least in part, the adaptive activity of the parent block and performing (210) a mixed-mode simulation based upon, at least in part, the adaptive activity of the top block.

Embodiments of current modeling process 10 may be configured to enhance a vector-based flow that may be available in EDA application 20, such as the applications available from the Assignee of the present disclosure. In some solutions any vector-based analysis uses one or more mapping files to map names between RTL and gate level domains.

As used herein the phrase "electrical power analysis" may refer to the method to measure rate at which electrical energy is consumed per unit time in an electrical circuit. The phrase "value change dump" or "VCD" is an ASCII-based format for dumpfiles generated by EDA logic simulation tools. It may represent signal transitions during a certain time window. The phrase "vector-based power analysis" may refer to an analysis that uses Verilog value change dump (VCD), or other vector file formats, from a simulation to know the activity of an instance at a given time. This activity may be used to calculate the current flowing across the instance and compute consumed power. The phrase "vector-less power analysis" may use predictive and/or statistical algorithms to estimate the instantaneous activity of a sequential elements and corresponding combinational elements. The estimated activity is used to compute transient power. The term "activity" may refer to how many gates are actually toggling on and off, which corresponds to power. The phrase "synchronous sequential elements" may refer to instances in an electronic design whose state changes at discrete times in response to a clock signal. Flops are often the primary synchronous sequential elements in a circuit. "RTL" may refer to design abstraction or a high level representation of a circuit, a behavioral model, while "Gate" names may refer to lower-level names of a circuit, its structure represented by logic gate cells. As used herein, there may be multiple types of VCDs. For example, in RTL VCD, design abstraction is at the RTL level. Accordingly, signals may be on primary ports and sequential elements that are invariant points, meaning that will be for sure present in gate domain. Alternatively, in gate-level VCD, all of the value change dumps are for gate-level names, meaning that transitions are present for combinational logic as well. The phrase transient analysis may refer to a technique to measure the amount of current flowing across every instance (gate) of a digital circuit at a particular given time. The estimated current (I) is used to calculated power (P) once the instance voltage is known by P=I*V. The phrase "mixed-mode power analysis" may use a vector-based analysis method for the annotated portion of the design and a vector-less technique to analyze un-annotated portion of the design. The term "block" may refer to a portion or subportion of an electronic design.

Power analysis of a gate level circuit is traditionally dependent on VCD, or other vector file formats, generated by a simulation tool at various past stages of the design (e.g., vector-based analysis). Here, logic states of all instances are predetermined based on simulation stimulus. For Gate VCD, the simulation can be directly used for power calculation. However, for RTL VCD, a mapping file is initially required to map the corresponding names to a gate-level netlist. Alternatively, a designer may need a full RTL netlist to regenerate the mapping file. As such, this approach involves extra overhead to generate a correct mapping file with front end tools during back end or signoff phase. Accordingly, embodiments of mapping process 10 may provide an efficient and fast process where the translation of RTL names to gate-level names occurs automatically and without making use of an RTL netlist.

Some systems use a vector-based power analysis mapping method, which may require a map activity file. As such, the mapping of RTL names to netlist names strictly requires a mapping file specified externally. This mapping file has to be generated from tools which requires many days on several core machines. These mapping files may also need to be hand modified to improve their coverage. If a mapping file is not available a designer will need the RTL netlist to regenerate it, by using an additional and dedicated EDA application.

Embodiments of current modeling process 10 may be provide a technique to model the transient current of partially simulated hierarchical gate level (synthesized) design, targeted to achieve more accurate IR-drop analysis, for example, in an EDA application 20 such as the Cadence® Voltus™ product available from the Assignee of the subject application. Embodiments described below may provide a realistic current model of the entire chip, even in absence of simulation vectors of few blocks of the chip.

Figure 3:
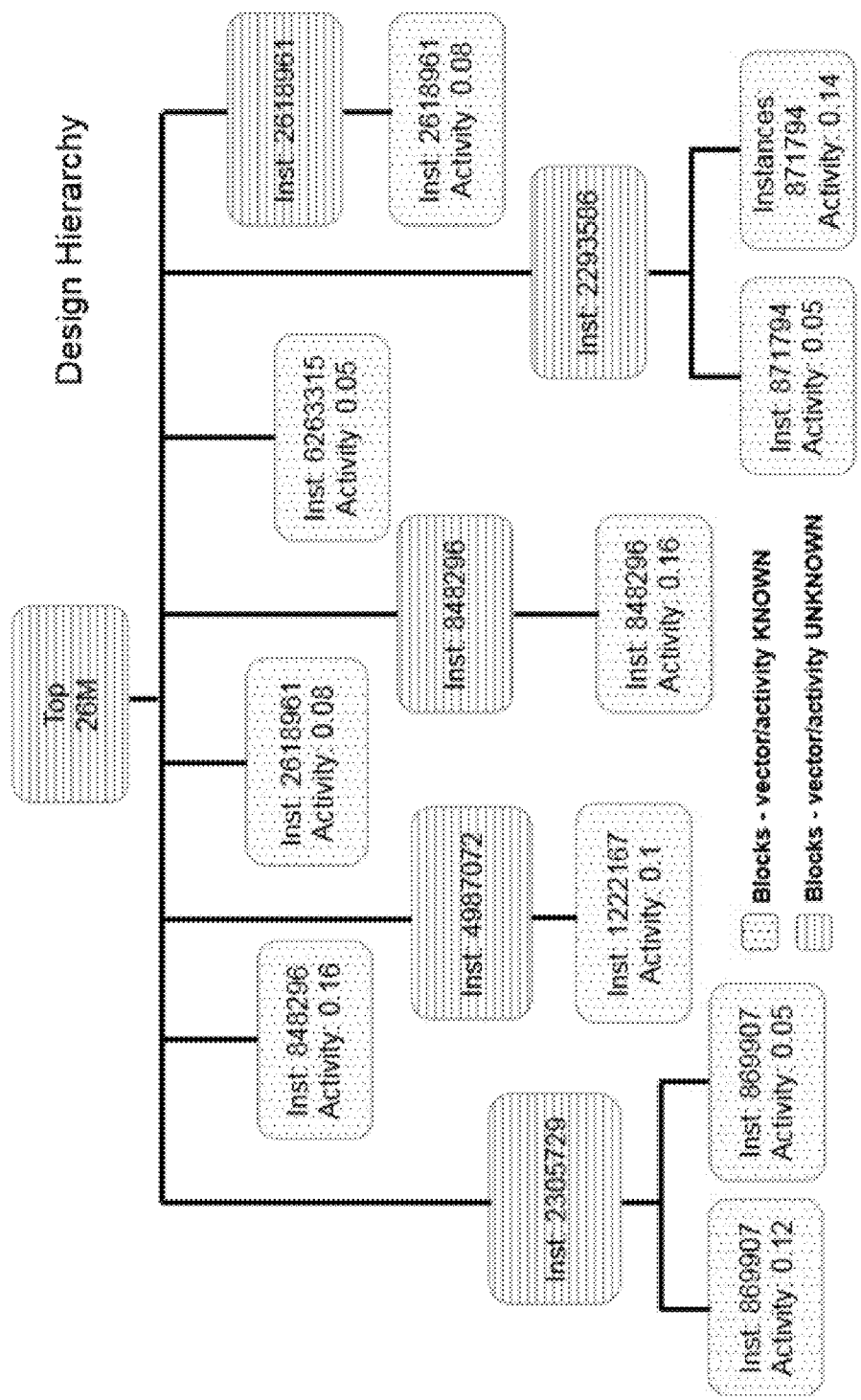
FIG. 3 is a schematic depicting an example design hierarchy in accordance with an embodiment of the present disclosure.

Referring now to FIG. 3, an example design hierarchy is provided. Some existing systems provide for vector-based power analysis, where current is computed for each state change in the design, as captured in simulation vectors (VCD). Similarly, some systems provide for vector-less analysis, which may be classified in two models. The first is an activity propagation model using vectorless analysis, wherein the tool tries to predict average activity of primary inputs and sequential elements and propagate the activity across the design. Instance current may be computed based on the average activity of each instances. The second is a state propagation model wherein the tool models exact instantaneous state of primary input and sequential elements based on an average activity suggested by user. For every clock cycle this state may be propagated through the circuit & current value is estimated for every transition. Some systems may perform mixed-mode analysis. In this mode, the tool may compute transient current of annotated instances using vector-based analysis, and uses vector-less method to compute current for rest of the circuit. The mixed-mode model is very sensitive to the target activity provided by user. It may lead to very optimistic or pessimistic transient current computation, which would mislead voltage drop analysis.

Figure 4:
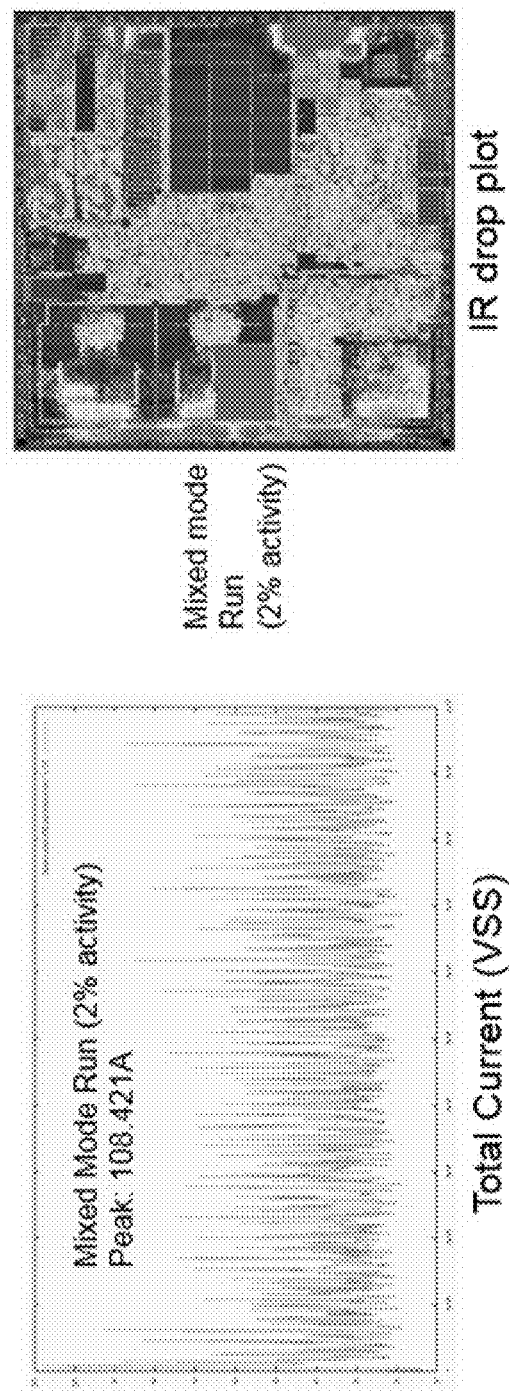
FIG. 4 is a schematic depicting schematics of total current and an IR drop plot using an optimistic analysis.
Figure 5:
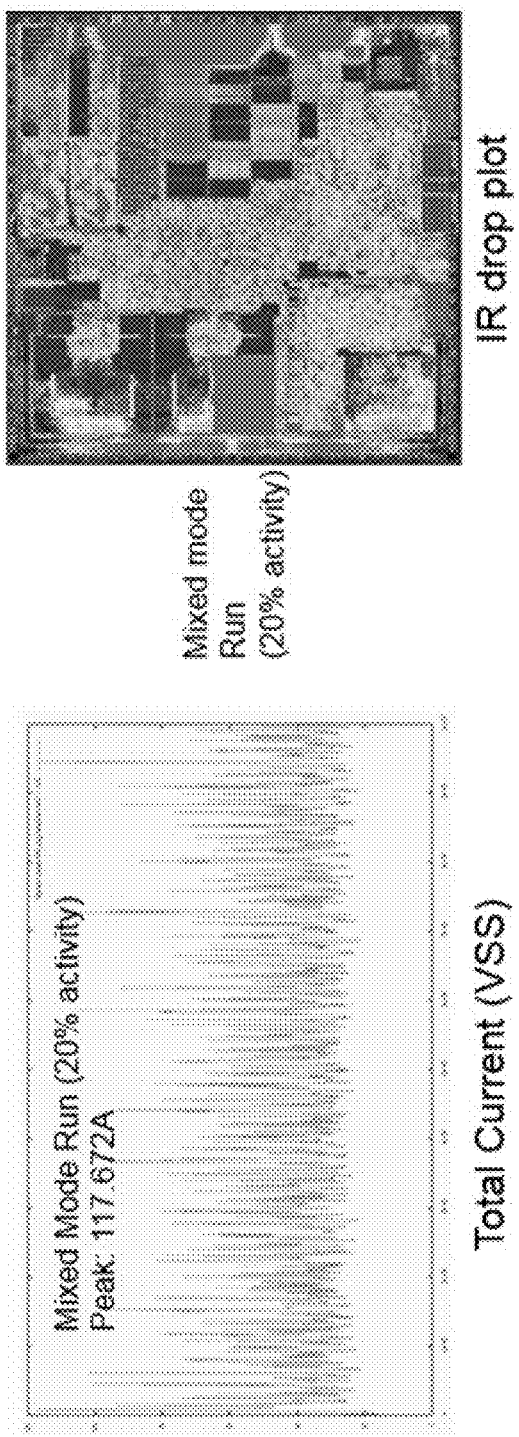
FIG. 5 is a schematic depicting schematics of total current and an IR drop plot using a pessimistic analysis.

Referring also to FIG. 4, examples of a mixed mode run showing the total current (VSS) and IR drop plot for an optimistic analysis are provided. Specifically, FIG. 4 depicts a mixed mode run with user defined activity of 2%, a peak current value of 108.421 mA, and violating instances (IR drop >50 mv) of 5078485. FIG. 5 depicts a pessimistic analysis with a mixed mode run with user defined activity of 20%, a peak current value of 117.672 mA, and violating instances (IR drop >50 mv) of 7396819.

Referring now to FIGS. 6-10, embodiments of current modeling process 10 are provided. Embodiments of current modeling process 10 may be configured to identify activity of sequential elements of leaf blocks from available simulation vectors. The process may compute an adaptive activity of a parent block based upon, at least in part, a weighted average of known activity of all leaf blocks. The process may hierarchically compute activity bottom-up until activity of the Top block is known. The Top block activity may be used as the design activity to run a mixed-mode simulation. An example computation of adaptive activity is provided below:

$$\text{Adaptive activity} = \frac{\sum (\text{block instances})_i * (\text{block activity})_i}{\sum (\text{block instances})_i} \quad \text{Equation 1}$$

where $i$ is the list of blocks having vectors/activity known

Embodiments of current modeling process 10 may be configured to adaptively predict the sequential activity of the whole design to anchor vector-less simulation of the un-annotated circuit. Moreover, embodiments of current modeling process 10 may use available activity information of a partially annotated gate level design to adaptively calculate the activity of neighboring blocks. This information may then be used incrementally to be able to predict the activity of the entire electronic design.

Figure 6:
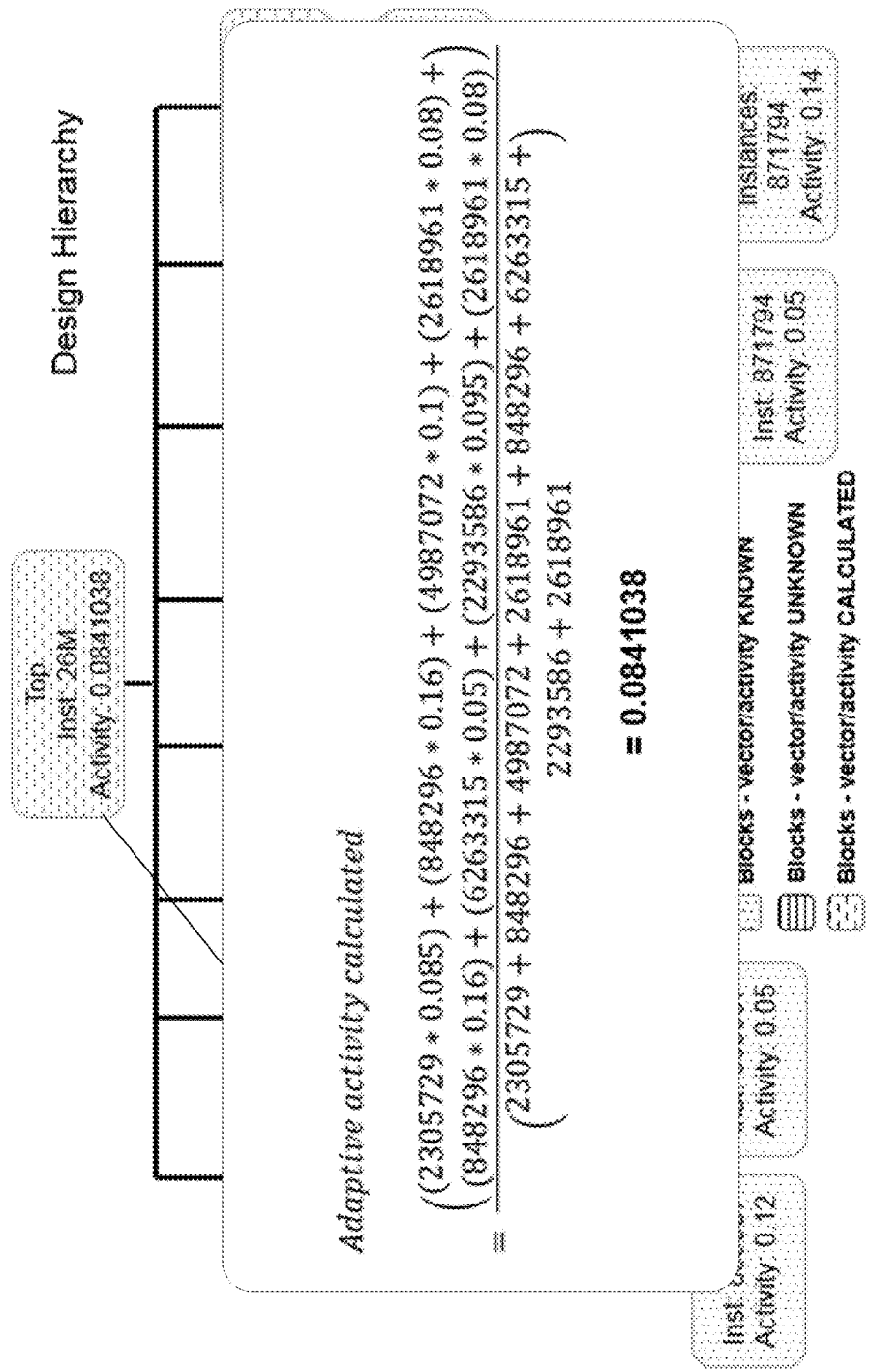
FIG. 6 is a schematic showing a sample computation of adaptive activity for an example of the current modeling process in accordance with an embodiment of the present disclosure.
Figure 7:
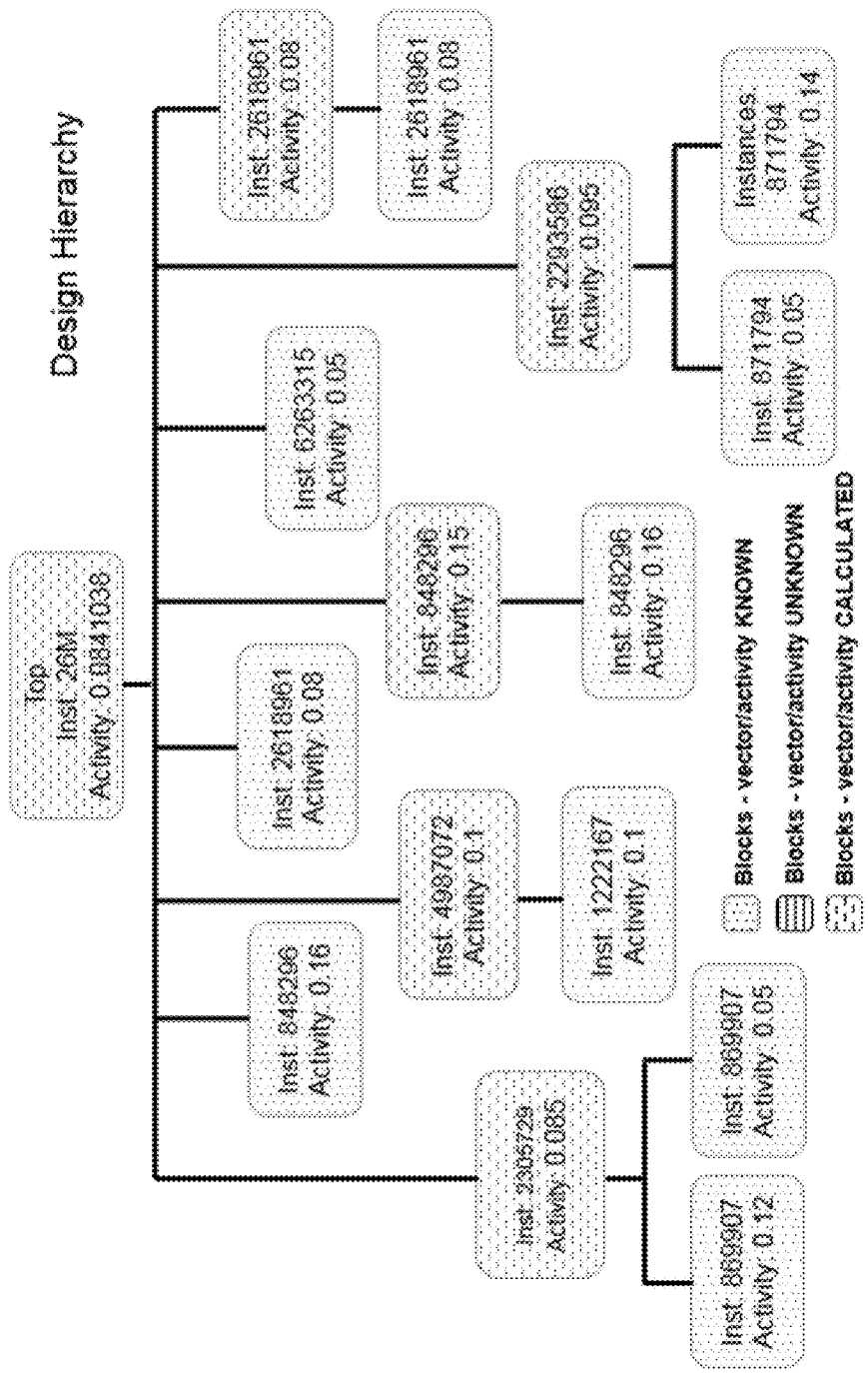
FIG. 7 is a schematic depicting aspects of the current modeling process in accordance with an embodiment of the present disclosure.

Referring now to FIGS. 6-7, embodiments of current modeling process 10 showing an example computation of adaptive activity is provided. As is shown in the Figures, some of the blocks may have known vector/activity, some may have unknown vector/activity, and some may have calculated vector/activity.

Figure 8:
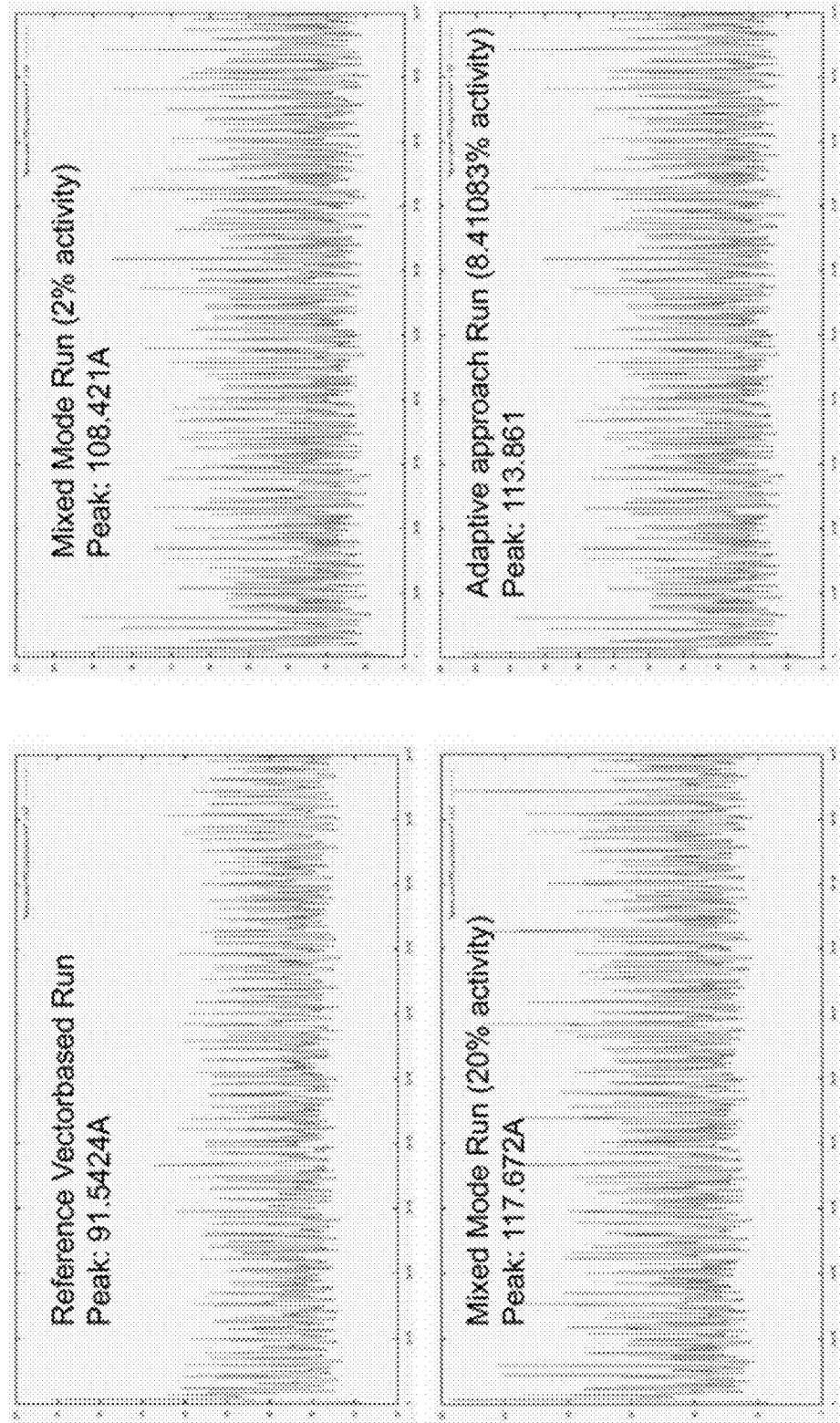
FIG. 8 is a schematic showing results of total current for different analysis based on an adaptive approach analysis.
Figure 9:
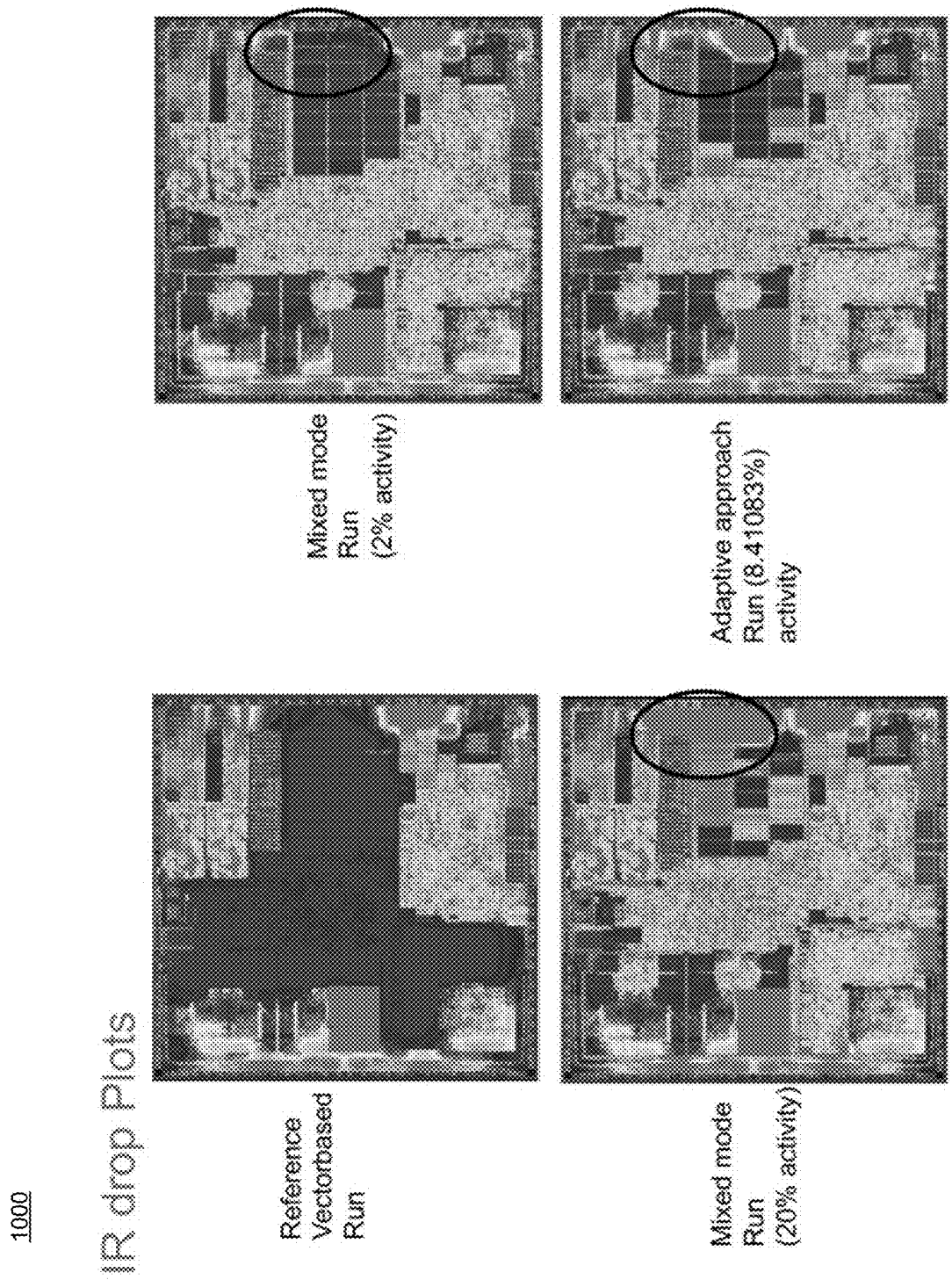
FIG. 9 is a schematic depicting schematics of an IR drop results using a realistic analysis.
Figure 10:
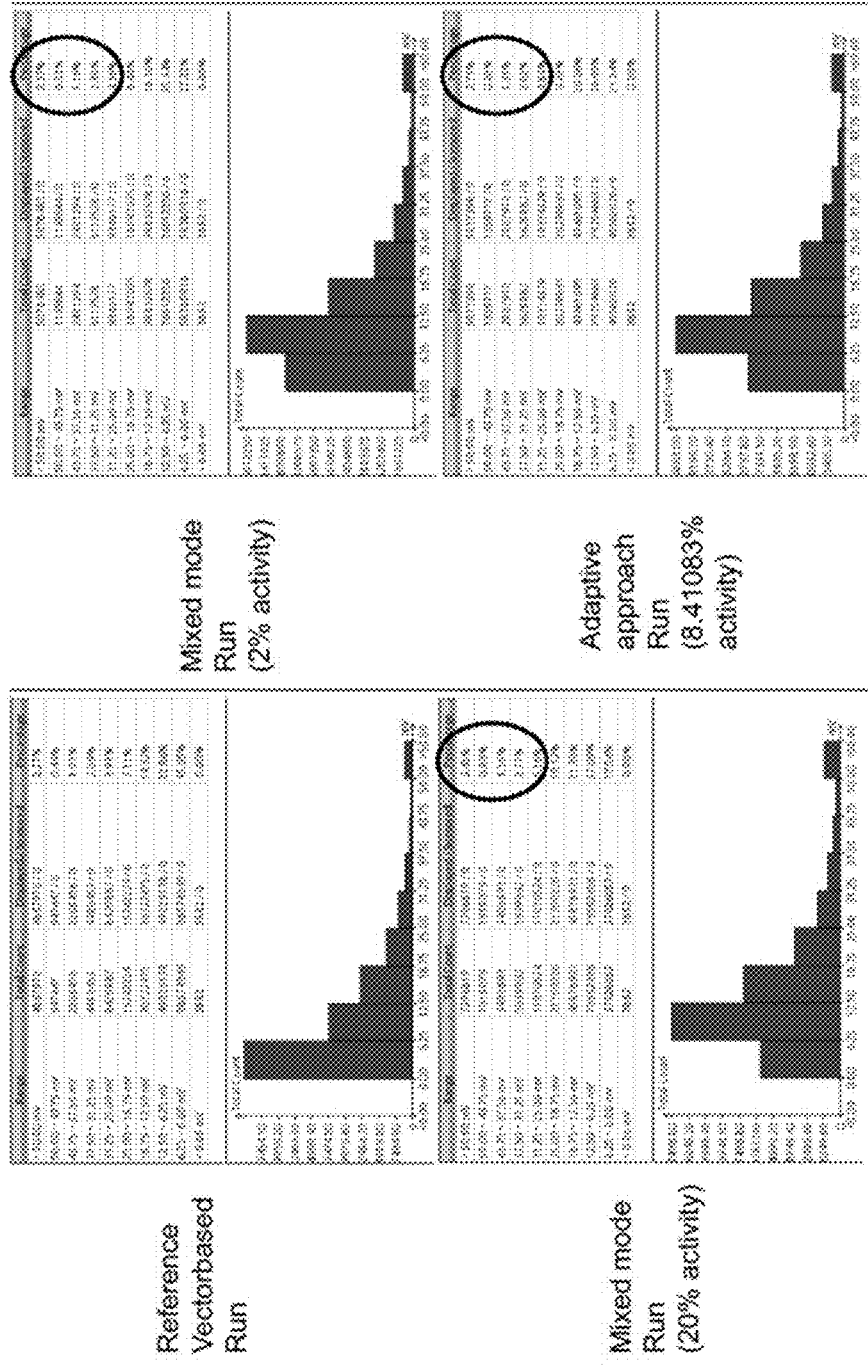
FIG. 10 is a schematic depicting results of an IR drop results using a realistic analysis.

FIG. 8 shows a total current (vss) plot comparison obtained for a number of different analysis types. These include vector-based, mixed mode analysis with 2% activity, mixed mode analysis with 20% activity and mixed mode analysis based on adaptive approach activity in accordance with current modeling process 10. FIG. 9 shows IR drop plots compared for the different analysis types discussed above. Similarly, FIG. 10 shows IR drop results statistics compared for the various analysis types.

Accordingly, embodiments of current modeling process 10 provide a technique to model transient current of partially simulated hierarchical gate level (synthesized) design, targeted to achieve more accurate IRdrop analysis in an EDA application 20 (e.g. VOLTUS, etc.). Embodiments included herein may provide a realistic current model of an entire chip in hybrid mode, even in absence of simulation vectors of few blocks of the chip.

In existing solutions, tools expect user to predict a target activity of the circuit. This target activity is used to anchor the vector-less simulation for the un-annotated portion of the design. In reality, it is difficult for user to predict a target activity of the circuit. Any approximation leads to a very unrealistic analysis, making hybrid mode simulation unreliable. In existing solutions, users cannot predict a target activity of the circuit, leading to unrealistic analysis which makes the hybrid mode technology unreliable. Accordingly, embodiments of current modeling process 10 enable a voltage drop analysis that may be globally aligned with the chip behavior, instead of biased for/against un-annotated portion of the design.

In some embodiments, EDA application 20 may support a variety of languages and/or standards. Some of these may include, but are not limited to, CDL, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for modeling transient current of a partially simulated hierarchical gate-level electronic design comprising:
   providing, using one or more processors, a partially simulated hierarchical gate-level electronic design, wherein the design includes a design hierarchy having one or more leaf blocks associated therewith;
   identifying activity of one or more sequential elements of the one or more leaf blocks using one or more simulation vectors, wherein the activity is used to estimate an amount of current associated with the one or more sequential elements;
   computing an adaptive activity of a parent block of the one or more leaf blocks, wherein the adaptive activity of the parent block corresponds to a weighted average of known activity of one or more leaf blocks;
   generating an adaptive activity of a top block of the one or more leaf blocks, based upon, at least in part, the adaptive activity of the parent block; and
   performing a mixed-mode simulation based upon, at least in part, the adaptive activity of the top block.

2. The computer-implemented method of claim 1, wherein generating an adaptive activity of a top block of the one or more leaf blocks includes hierarchically computing activity from a bottom-most level up through the design hierarchy until determining the adaptive activity of the top block.

3. The computer-implemented method of claim 1, wherein the adaptive activity of the top block or the adaptive activity of the parent block is based upon, at least in part, a sum of a number of block instances and a block activity level.

4. The computer-implemented method of claim 3, wherein the adaptive activity of the top block or the adaptive activity of the parent block is based upon, at least in part, a list of blocks having known activity levels.

5. The computer-implemented method of claim 1, wherein the one or more leaf blocks include at least one block having a known activity level, at least one block having an unknown activity level, and at least one block having a calculated activity level.

6. The computer-implemented method of claim 5, wherein generating the adaptive activity of the top block of the one or more leaf blocks is based upon, at least in part, the adaptive activity of a plurality of parent blocks.

7. The computer-implemented method of claim 1, wherein performing a mixed-mode simulation includes a vector based analysis method and a vector-less analysis method.

8. A system for modeling transient current of a partially simulated hierarchical gate-level electronic design comprising:
   a computing device having at least one processor configured to receive, using one or more processors, a partially simulated hierarchical gate-level electronic design, wherein the design includes a design hierarchy having one or more leaf blocks associated therewith, the at least one processor further configured to identify activity of one or more sequential elements of the one or more leaf blocks using one or more simulation vectors, wherein the activity is used to estimate an amount of current associated with the one or more sequential elements, the at least one processor further configured to compute an adaptive activity of a parent block of the one or more leaf blocks, wherein the adaptive activity of the parent block corresponds to a weighted average of known activity of one or more leaf blocks, the at least one processor further configured to generate an adaptive activity of a top block of the one or more leaf blocks, based upon, at least in part, the adaptive activity of the parent block, the at least one processor further configured to perform a mixed-mode simulation based upon, at least in part, the adaptive activity of the top block.

9. The system of claim 8, wherein generating an adaptive activity of a top block of the one or more leaf blocks includes hierarchically computing activity from a bottom-most level up through the design hierarchy until determining the adaptive activity of the top block.

10. The system of claim 8, wherein the adaptive activity of the top block or the adaptive activity of the parent block is based upon, at least in part, a sum of a number of block instances and a block activity level.

11. The system of claim 10, wherein the adaptive activity of the top block or the adaptive activity of the parent block is based upon, at least in part, a list of blocks having known activity levels.

12. The system of claim 11, wherein generating the adaptive activity of the top block of the one or more leaf blocks is based upon, at least in part, the adaptive activity of a plurality of parent blocks.

13. The system of claim 8, wherein the one or more leaf blocks include at least one block having a known activity level, at least one block having an unknown activity level, and at least one block having a calculated activity level.

14. The system of claim 8, wherein performing a mixed-mode simulation includes a vector based analysis method and a vector-less analysis method.

15. A computer readable storage medium having stored thereon instructions, which when executed by a processor, result in one or more operations for modeling transient current of a partially simulated hierarchical gate-level electronic design, the operations comprising:
 providing, using one or more processors, a partially simulated hierarchical gate-level electronic design, wherein the design includes a design hierarchy having one or more leaf blocks associated therewith;
 identifying activity of one or more sequential elements of the one or more leaf blocks using one or more simulation vectors, wherein the activity is used to estimate an amount of current associated with the one or more sequential elements;
 computing an adaptive activity of a parent block of the one or more leaf blocks, wherein the adaptive activity of the parent block corresponds to a weighted average of known activity of one or more leaf blocks;
 generating an adaptive activity of a top block of the one or more leaf blocks, based upon, at least in part, the adaptive activity of the parent block; and
 performing a mixed-mode simulation based upon, at least in part, the adaptive activity of the top block.

16. The computer readable storage medium of claim 15, wherein generating an adaptive activity of a top block of the one or more leaf blocks includes hierarchically computing activity from a bottom-most level up through the design hierarchy until determining the adaptive activity of the top block.

17. The computer readable storage medium of claim 15, wherein the adaptive activity of the top block or the adaptive activity of the parent block is based upon, at least in part, a sum of a number of block instances and a block activity level.

18. The computer readable storage medium of claim 17, wherein the adaptive activity of the top block or the adaptive activity of the parent block is based upon, at least in part, a list of blocks having known activity levels.

19. The computer readable storage medium of claim 15, wherein the one or more leaf blocks include at least one block having a known activity level, at least one block having an unknown activity level, and at least one block having a calculated activity level.

20. The computer readable storage medium of claim 15, wherein performing a mixed-mode simulation includes a vector based analysis method and a vector-less analysis method.

\* \* \* \* \*